(12) United States Patent
Jha et al.

(10) Patent No.: US 12,072,078 B2
(45) Date of Patent: Aug. 27, 2024

(54) PROTECTIVE COVER FOR A FUSELAGE-MOUNTED EXTERIOR AIRCRAFT LIGHT AND EXTERIOR AIRCRAFT LIGHT

(71) Applicant: Goodrich Lighting Systems GmbH & Co. KG, Lippstadt (DE)

(72) Inventors: Anil Kumar Jha, Lippstadt (DE); Andre Hessling-von Heimendahl, Koblenz (DE); Christian Schön, Dortmund (DE); Christo Tsibadze, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/452,001

(22) Filed: Aug. 18, 2023

(65) Prior Publication Data
US 2024/0060626 A1 Feb. 22, 2024

(30) Foreign Application Priority Data
Aug. 18, 2022 (EP) ..................... 22191038

(51) Int. Cl.
*F21V 15/01* (2006.01)
*B64D 47/06* (2006.01)
(52) U.S. Cl.
CPC .............. *F21V 15/01* (2013.01); *B64D 47/06* (2013.01)

(58) Field of Classification Search
CPC ................................ F21V 15/01; B64D 47/06
See application file for complete search history.

(56) References Cited

U.S. PATENT DOCUMENTS

| 10,464,692 B2 | 11/2019 | Jha et al. |
| 2002/0000172 A1 | 1/2002 | Ganghofer |

FOREIGN PATENT DOCUMENTS

| EP | 3725687 A1 | 10/2020 | |
| EP | 3939894 A1 * | 1/2022 | ............ B64D 47/02 |
| EP | 3939894 A1 | 1/2022 | |
| EP | 4043348 A1 | 8/2022 | |

OTHER PUBLICATIONS

European Search Report for Application No. 22191038.3, mailed Feb. 3, 2023, 6 pages.

\* cited by examiner

*Primary Examiner* — Abdulmajeed Aziz
*Assistant Examiner* — Jessica M Apenteng
(74) *Attorney, Agent, or Firm* — CANTOR COLBURN LLP (57) ABSTRACT

A protective cover for a fuselage-mounted exterior aircraft light includes a fuselage-facing mounting side for mounting the protective cover to an exterior aircraft light housing or to an exterior skin of an aircraft; a light transmissive forward facing light emission surface; and an air deflection zone, which is shaped to direct a portion of an impinging air stream (A) along and over the forward facing light emission surface for shielding the forward facing light emission surface from the impinging air stream (A).

15 Claims, 7 Drawing Sheets

PROTECTIVE COVER FOR A FUSELAGE-MOUNTED EXTERIOR AIRCRAFT LIGHT AND EXTERIOR AIRCRAFT LIGHT

CROSS REFERENCE TO RELATED APPLICATION

This application claims priority to European Patent Application No. 22191038.3 filed Aug. 18, 2022, the entire contents of which is incorporated herein by reference.

TECHNICAL FIELD

The present invention is in the field of exterior aircraft lights. The present invention is in particular in the field of protective covers for exterior aircraft lights.

BACKGROUND

Almost all aircraft are equipped with aircraft lights, including exterior aircraft lights, which are installed on the outside of the aircraft, and interior aircraft lights, which are installed within the aircraft. Exterior aircraft lights may include take-off lights, landing lights, navigation lights, taxi lights, runway turn-off lights, logo lights, cargo loading lights, wing scan lights, engine scan lights, and search lights. Exterior aircraft lights may further comprise exterior anti-collision lights, which may include white strobe anti-collision lights and red-flashing beacon lights.

Each exterior aircraft light usually comprises a protective cover, which is configured for protecting the functional components of the exterior aircraft light from adverse external influences, such as mechanical impacts and streams of ambient air. The streams of ambient air may comprise water, moisture and/or particles, such as dust and dirt, which would adversely affect or even damage the light sources and other functional components of the exterior aircraft light in the absence of a protective cover.

The protective covers, in particular those portions of the protective covers that are exposed to a head-on impinging stream of ambient air during flight, are prone to erosion. The erosion may deteriorate the optical properties of the protective cover, resulting in an inferior light emission of the exterior aircraft light.

It would therefore be beneficial to provide a protective cover for an exterior aircraft light that is less prone to erosion caused by impinging air streams.

SUMMARY

Exemplary embodiments of the invention include a protective cover for a fuselage-mounted exterior aircraft light, wherein the protective cover comprises: a fuselage-facing mounting side for mounting the protective cover to an exterior aircraft light housing or to an exterior skin of an aircraft; a light transmissive forward facing light emission surface; and an air deflection zone, which is shaped to direct a portion of an impinging air stream along and over the forward facing light emission surface for shielding the forward facing light emission surface from the impinging air stream.

Exemplary embodiments of the invention further include an exterior aircraft light, which comprises an exterior aircraft light housing; at least one light source; and a protective cover according to an exemplary embodiment of the invention. An interior space may be formed between the aircraft light housing and the protective cover, and the at least one light source may be arranged within said interior space.

Exemplary embodiments of the invention also include an aircraft, such as an air plane or a rotorcraft, which comprises at least one exterior aircraft light according to an exemplary embodiment of the invention.

Exemplary embodiments of the invention allow for directing a portion of an impinging air stream along and over the forward facing light emission surface of the exterior aircraft light. The deflection of said portion of the impinging air stream may causes said portion to not directly hit or impinge on the forward facing light emission surface. In other words, the deflected portion of the impinging air stream may be prevented from hitting the forward facing light emission surface head-on. The deflected portion of the impinging air stream may in particular be deflected in such a way that it has a strong/large velocity component that is oriented parallel to the forward facing light emission surface and only a low/small velocity component that is oriented orthogonal to the forward facing light emission surface. With said deflection, the re-directed portion of the impinging air stream may be prevented from hitting the forward facing light emission surface head-on and may act as a shield for the forward facing light emission surface for other portions of the impinging air stream. The air deflection zone may act as a spoiler for a portion of the impinging air stream, which spoiler may provide for improved aerodynamics around the protective cover in terms of erosion-resistance.

By directing at least a portion of the impinging air stream along and over the forward facing light emission surface, particles and drops of water, which may be comprised in and carried with the impinging air stream, are directed along and over the forward facing light emission surface of the protective cover as well. In consequence, these particles and drops of water are prevented from hitting the forward facing light emission surface head-on/straight/with a high velocity component orthogonal to the forward facing light emission surface. As a result, the erosion of the forward facing light emission surface of a protective cover due to particles in the impinging air stream may be considerably reduced.

The protective cover has an air deflection zone. The air deflection zone may act as a spoiler for a portion of the impinging air stream. The spoiler may provide for improved aerodynamics around the protective cover in terms of erosion-resistance of the protective cover.

In an embodiment, the protective cover further comprises a base portion, which includes the fuselage-facing mounting side and the air deflection zone, and an at least partially light transmissive light output portion, which is arranged on the base portion and which includes the forward facing light emission surface. A configuration of the protective cover which comprises a base portion with an air deflection zone and a light output portion has been found particularly beneficial for providing fuselage mounted exterior aircraft lights, such as red-flashing beacon lights and white strobe anti-collision lights, with good erosion-resistance.

In an embodiment of an exterior aircraft light, which comprises a base portion, the air deflection zone is formed on the base portion. A part of the base portion may in particular be shaped for providing the air deflection zone. Forming a part of the base portion as the air deflection zone may be a convenient and effective way of providing the air deflection zone.

In an embodiment, the air deflection zone comprises a concave air directing surface. The air deflection zone may further comprise an airflow breakaway edge, which is provided at an end portion of the concave air directing surface, which is oriented towards the forward facing light emission surface. In other words, the airflow breakaway edge may be formed at that end portion of the concave air directing surface that faces towards the forward facing light emission surface.

Such a combination of a concave air directing surface and an airflow breakaway edge may be highly effective in directing considerable portions of an impinging air stream along and over the forward facing light emission surface of the protective cover.

The airflow breakaway edge may in particular cause a portion of the deflected air stream to clearly separate from the concave air directing surface at the end of the concave air directing surface and to continue flowing along and over the forward facing light emission surface.

The airflow breakaway edge may cause the formation of a vortex of deflected air in front of the forward facing light emission surface. Such a vortex may provide an "air buffer", which protects and shields the forward facing light emission surface from particles and drops of water, which may be carried with the impinging flow of air.

In an embodiment, the concave air directing surface is substantially flat at the airflow breakaway edge. In other words, a portion of the concave air directing surface, which is arranged next to the airflow breakaway edge, may be substantially flat. A concave air directing surface, which is substantially flat at the airflow breakaway edge, may be particularly effective in directing portions of an impinging air stream along and over the forward facing light emission surface of the protective cover.

In an embodiment, the protective cover has a horizontal reference plane. The horizontal reference plane may in particular coincide with a mounting plane, which is provided along the fuselage-facing mounting side of the protective cover, which is configured for mounting the protective cover to the aircraft, in particular to the fuselage of the aircraft.

In an embodiment, the concave air directing surface, in particular the flat portion of the concave air directing surface, which is arranged next to the airflow breakaway edge, is inclined with respect to the horizontal reference plane at an inclination angle of between 50° and 80°, in particular at an inclination angle of between 60° and 70°. Such an inclination of the concave air directing surface has been found to be particularly effective in directing portions of an impinging air stream along and over the forward facing light emission surface of the protective cover.

In an embodiment, the airflow breakaway edge has a radius of curvature of less than 2 mm, in particular a radius of curvature of between 0.5 mm and 1.5 mm. With such a small radius of curvature, the functionality of separating the air flow from the exterior surface of the protective cover is achieved in a particularly effective manner. An airflow breakaway edge having the given radius values has been found to be particularly effective for causing a substantial portion of the deflected air flow to detach from the concave air directing surface and to flow along and over the forward facing light emission surface of the protective cover, without impinging onto the forward facing light emission surface.

In an embodiment, the light output portion has a first height and the concave air directing surface has a second height, wherein the second height is between 80% and 120%, in particular between 90% and 110% of the first height. The first and second heights may be measured along a direction orthogonal to the horizontal reference plane.

In an embodiment, the forward facing light emission surface has a first height and the concave air directing surface has a second height, wherein the second height is between 80% and 120%, in particular between 90% and 110% of the first height. The first and second heights may be measured along a direction orthogonal to the horizontal reference plane.

In an embodiment, the first height is in the range of between 15 mm and 45 mm. The first height may be in particular in the range of between 25 mm and 35 mm.

In an embodiment, the airflow breakaway edge is spaced from the light output portion/from the forward facing light emission surface by a distance of between 80% and 150% of the first height, in particular by a distance of between 100% and 120% of the first height. The distance between the airflow breakaway edge and the light output portion/the forward facing light emission surface may be measured along a direction, parallel to the horizontal reference plane.

The given dimensions/dimensional relations in terms of heights and in terms of spacing, implemented alone or in combination, have been found to provide a highly effective set-up for directing a large portion of the impinging air flow along and over the forward facing light emission surface of the protective cover. The detrimental erosion effect on the forward facing light emission surface may be mitigated to a particularly high degree.

In an embodiment, the base portion of the protective cover further comprises a tapered tail portion for guiding the portion of the impinging air stream, which was directed along and over the forward facing light emission surface, towards the aircraft fuselage. Such a tapered tail portion may allow for reducing the drag, which is generated by the protective cover, when it is exposed to an impinging air stream. A particularly good trade-off between low erosion and low drag may be achieved.

In an embodiment, the tapered tail portion has an upper surface, which is inclined with respect to the horizontal reference plane. The upper surface of the tapered tail portion may in particular be inclined with respect to the horizontal reference plane at an angle in the range of between 5° and 15°, more particularly at an angle of approximately 10°. Such an inclination of the upper surface of the tapered tail portion may be highly effective in avoiding the generation of vortices in the deflected portion of the air stream, after it has passed the light output portion. Avoiding the formation of vortices within the deflected air stream may reduce the drag, which is generated by the protective cover, when it is exposed to an impinging air stream.

In an embodiment, the base portion further comprises a pair of two convex side portions, which are arranged laterally next to the concave air directing surface, so that the concave air directing surface is arranged in between the two convex side portions. The two convex side portions may be configured for directing portions of the impinging air stream, in particular portions of air in a part of the impinging air stream that is close to the fuselage, laterally around the protective cover, in particular around the base portion of the protective cover. Providing of two convexly curved side portions at the base portion next to the concave air directing surface may allow for reducing the drag, which is caused by the protective cover, when it is exposed to the impinging air stream, by directing at least portions of air of the impinging air stream laterally around the protective cover.

In an embodiment, an exterior aircraft light according to an exemplary embodiment of the invention comprises a circumferential light emission surface, which allows the exterior aircraft light to emit light in all spatial directions in a horizontal plane, i.e. over an angular range of 360° around the exterior aircraft light. In an embodiment, the forward facing light emission surface is the forward facing part of the circumferential light emission surface.

In an embodiment, the exterior aircraft light is a fuselage-mounted aircraft beacon light. The term aircraft beacon light refers to a red-flashing aircraft beacon light, i.e. to an exterior aircraft light that is configured to emit a sequence of red light flashes in operation. In addition to the red-flashing functionality, the aircraft beacon light may be configured to provide white light flashes and/or IR light flashes. The fuselage-mounted aircraft beacon light may in particular be mounted onto the top (roof) or below the bottom (belly) of an aircraft.

In an embodiment, the exterior aircraft light is a fuselage-mounted exterior aircraft light, which is located at a wing root of an aircraft. The wing roots are the part of the aircraft that is located at the interface between the fuselage and the wings of the aircraft. The wing roots may be seen as the coupling structure between the fuselage and the wings of the aircraft. In the context of the present document, the wing roots are considered to be parts of the fuselage of the aircraft.

In an embodiment, the exterior aircraft light may by a landing light, a take-off light, a taxi-light, a runway-turnoff-light, or a multi-functional light, which provides the functionalities of at least two of a landing light, a take-off light, a taxi-light, and a runway-turnoff-light.

BRIEF DESCRIPTION OF THE DRAWINGS

Further exemplary embodiments of the invention are described below with respect to the accompanying drawings, wherein.

DETAILED DESCRIPTION

Figure 1:
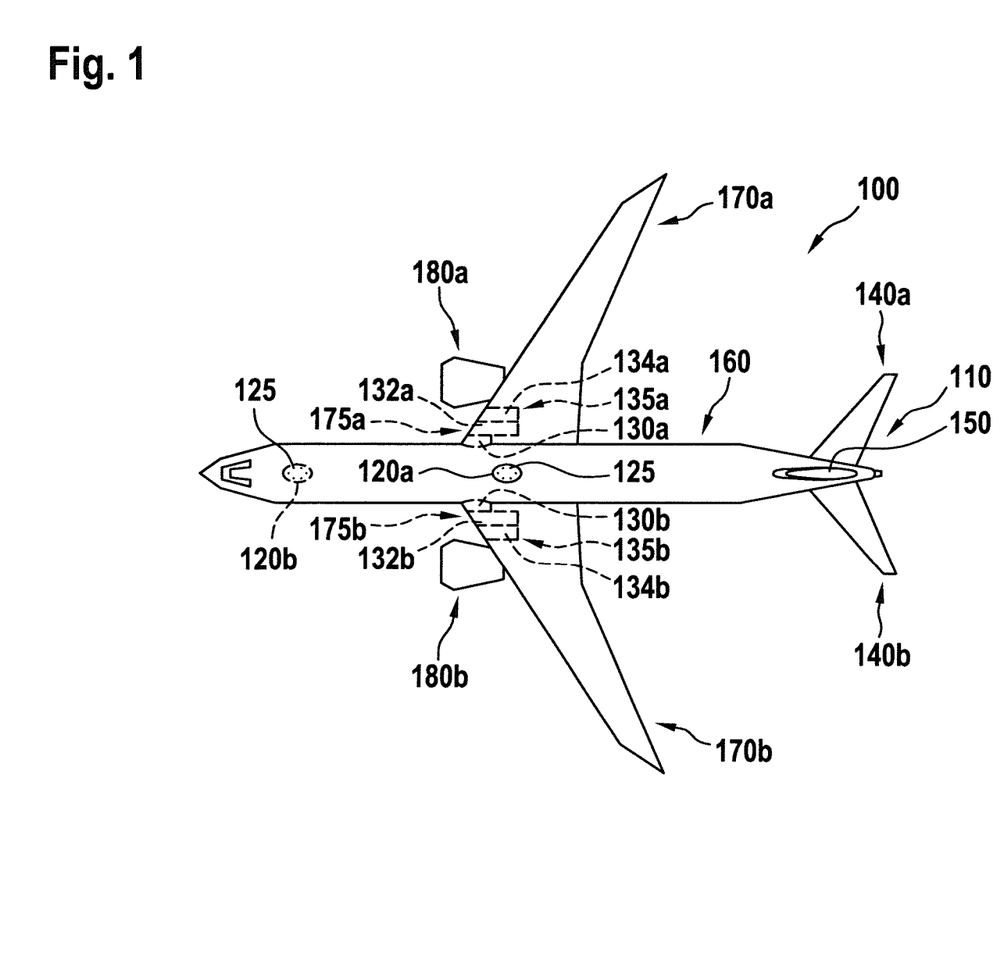
FIG. 1 shows a schematic top view of an aircraft, which is equipped with an aircraft exterior anti-collision light system according to an exemplary embodiment of the invention.
Figure 2:
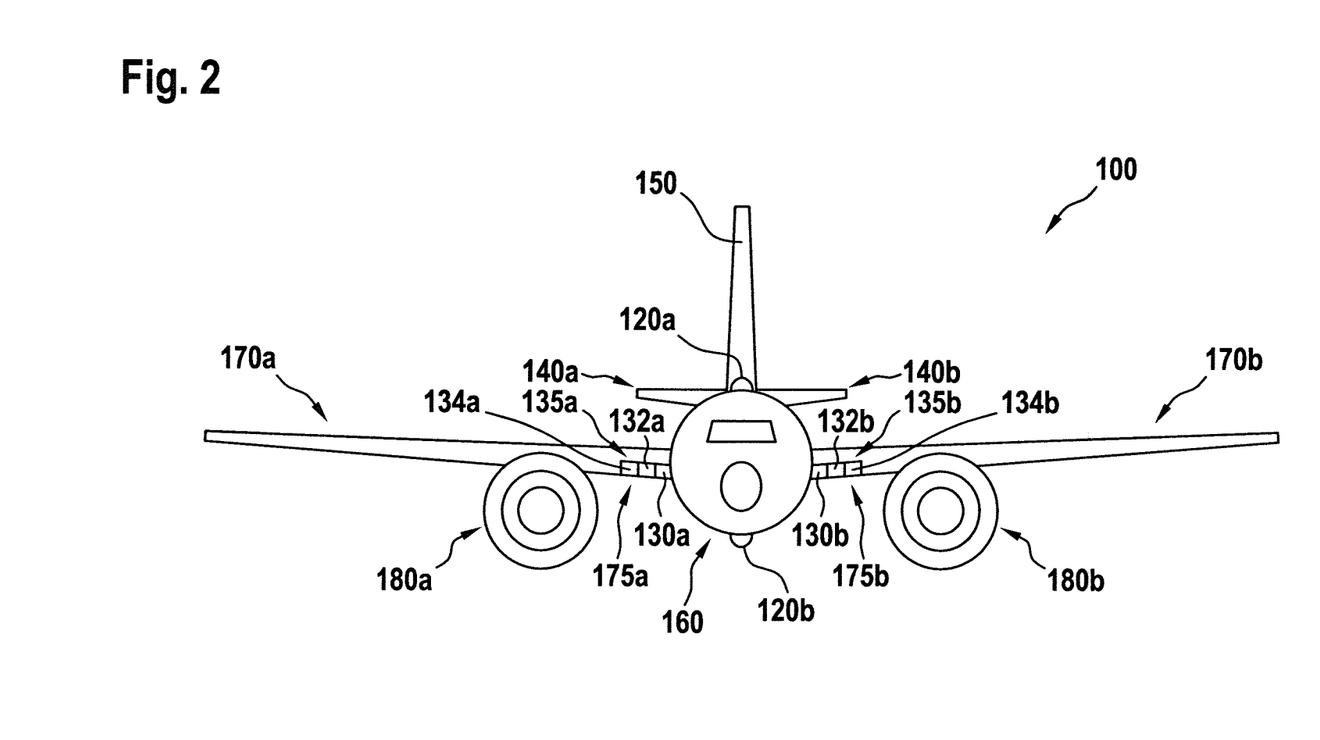
FIG. 2 shows a schematic front view of the aircraft shown in FIG. 1.

FIG. 1 shows a schematic top view of an aircraft 100, in particular of a passenger air plane 100, from a position above the aircraft 100. FIG. 2 shows a schematic front view of the aircraft 100, which is depicted in FIG. 1.

The aircraft 100 comprises a fuselage 160 and two wings 170a, 170b extending laterally from the fuselage 160. The wings 170a, 170b are joined with the fuselage 160 at the wing roots 175a, 175b of the aircraft 100. A respective engine 180a, 180b is attached to each of the wings 170a, 170b.

The aircraft 100 further comprises two horizontal stabilizers 140a, 140b and a vertical stabilizer 150, which are mounted to an aft section of the fuselage 160.

The aircraft 100 is equipped with a variety of exterior aircraft lights.

Out of the total set of exterior aircraft lights, which may be provided at the exterior of the aircraft 100, only two combined landing and take-off lights 130a, 130b, two taxi lights 132a, 132b, two runway turn-off lights 134a, 134b, and two red-flashing beacon lights 120a, 120b are depicted in FIGS. 1 and 2.

The aircraft 100 may be equipped with additional exterior lights, which may in particular include at least one of navigation lights, logo lights, wing scan lights, engine scan lights, white strobe anti-collision lights and/or cargo loading lights. For clarity and simplicity of the illustration and description, these additional types of exterior aircraft lights are not depicted in FIGS. 1 and 2.

The aircraft 100 shown in FIGS. 1 and 2 is equipped with an upper red-flashing beacon light 120a, which is installed in an upper portion of the aircraft 100, in particular on top of the fuselage 160. In an alternative configuration, the upper red-flashing beacon light 120a may be installed in an upper portion of the vertical stabilizer 150, in particular on top of the vertical stabilizer 150.

The aircraft 100 further comprises a lower red-flashing beacon light 120b, which is installed in a lower portion of the aircraft 100. The lower red-flashing beacon light 120b may in particular be mounted to the bottom of the fuselage 160.

Although only one lower red-flashing beacon light 120b is depicted in FIGS. 1 and 2, the aircraft 100 may comprise two or more lower red-flashing beacon lights 120b, which may be installed at different positions along the longitudinal extension of the fuselage 160. A first lower red-flashing beacon light may, for example, be mounted to a front portion of the fuselage 160 close to the front gear of the aircraft 100, and a second lower red-flashing beacon light may, for example, be mounted to a middle portion of the fuselage 160 close to the main gear of the aircraft 100 and/or to an aft portion of the fuselage below the horizontal and vertical stabilizers 140a, 140b, 150.

In the exemplary embodiment of FIGS. 1 and 2, each of the beacon lights 120a, 120b comprises a plurality of light sources 125, which are configured/controlled for emitting red light flashes. The plurality of light sources 125 may be LEDs, or may comprise LEDs. Each of the beacon lights 120a, 120b may further comprise at least one optical element, which is not shown in the Figures, such as a lens or a reflector, for forming the light output, which is emitted by the respective beacon light 120a, 120b. In the exemplary embodiment of FIGS. 1 and 2, the plurality of light sources 125 are arranged in a circular configuration. Such a configuration helps in providing an effective 360° beacon light output in the horizontal plane. The at least one optical element may be shaped and arranged to ensure that the output light intensity distribution of the beacon light output is in compliance with aircraft manufacturer specifications and/or aviation regulations, such as Federal Aviation Regulations section 25.1401, as in force on the priority date of the present application.

During use of the aircraft, the beacon lights 120a, 120b are commonly switched on when the engines 180a, 180b of the aircraft 100 are started, such that the emitted sequences of light flashes may help to inform and warn ground personnel in the vicinity of the aircraft 100 that the engines 180a, 180b have been started.

The beacon lights 120a, 120b may flash with a flash frequency flash in the range of between 40 and 100 flashes per minute, in particular with a flash frequency flash in the range of between 55 and 65 flashes per minute, more particularly with a flash frequency flash of 60 flashes per minute.

The aircraft 100 further comprises two combined landing and take-off lights 130a, 130b, two taxi lights 132a, 132b, and two runway turn-off lights 134a, 134b. In the exemplary embodiment depicted in FIGS. 1 and 2, the combined landing and take-off lights 130a, 130b, the taxi lights 132a, 132b, and the runway turn-off lights 134a, 134b are located in the wings roots 175a, 175b of the aircraft 100. The wing roots 175a, 175b are those portions of the fuselage 160, to which the wings 170a, 170b are mounted. The wing roots 175a, 175 may also be seen as connecting portions between the fuselage 160 and the wings 170a, 170b. In the context of the present document, the wing roots 175a, 175b are seen as portions of the fuselage 160.

Next, an exterior aircraft light 120 according to an exemplary embodiment of the invention, which is in particular configured for being employed as a beacon light 120a, 120b, is described in detail with reference to FIGS. 3 to 7.

Figure 3:
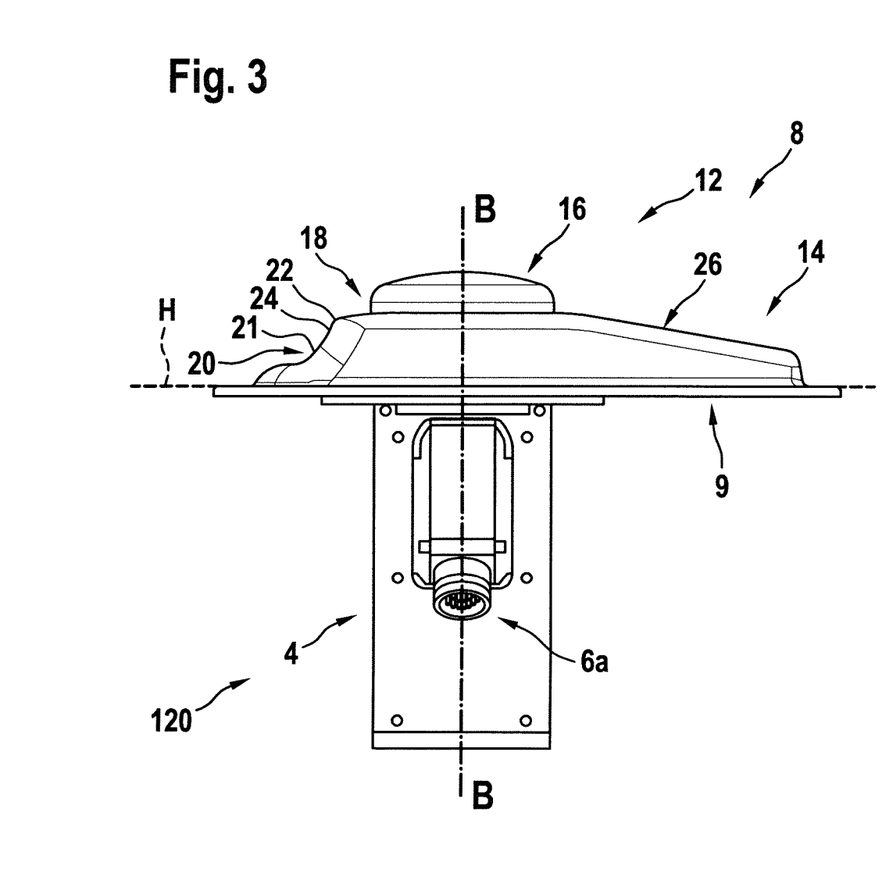
FIG. 3 shows a side view of an exterior aircraft light according to an exemplary embodiment of the invention
Figure 4:
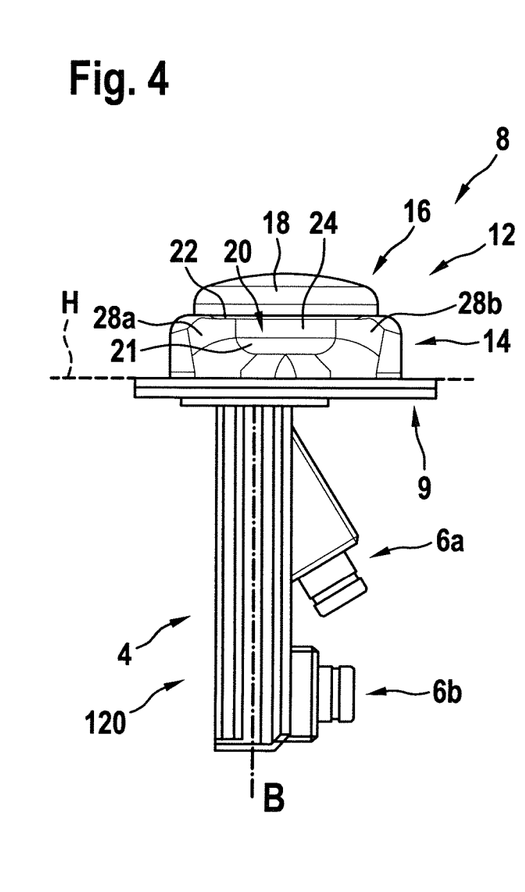
FIG. 4 shows a front view of the exterior aircraft light depicted in FIG. 3.

FIG. 3 shows a side view of an exterior aircraft light 120 according to an exemplary embodiment of the invention, and FIG. 4 shows a front view thereof.

The exterior aircraft light 120, which is depicted in FIGS. 3 and 4, comprises an inner housing 4, which is configured to be arranged within the aircraft 100, in particular within the outer skin of the fuselage 160 of the aircraft 100, when the exterior aircraft light 120 is mounted to the aircraft 100. The exterior aircraft light 120 further comprises an exterior portion 8, which is configured for being located on the outside the aircraft 100, in particular on the outside of the fuselage 160 of the aircraft 100, so that the exterior portion 8 is exposed to ambient air. The exterior portion 8 of the exterior aircraft light 120 is in particular exposed to an impinging stream of ambient air, when the aircraft 100 is in flight.

In the embodiment depicted in FIGS. 3 and 4, the inner housing 4 has a basically cylindrical shape, which extends along an axis B. The exterior portion 8 has a mounting side 9, which is the lower side of the exterior portion 8 in the orientation depicted in FIGS. 3 and 4, and which is configured for attaching the exterior portion 8 of the exterior aircraft light 120 to the outer skin of the fuselage 160 of the aircraft 100. In the exemplary embodiment depicted in FIGS. 3 and 4, the mounting side 9 extends along a horizontal reference plane H, which is substantially orthogonal to the axis B, which is defined by the inner housing 4.

The shape and the orientation of the inner housing 4, as they are depicted in FIGS. 3 and 4, are only exemplary. In alternative embodiments, the inner housing 4 may have a different shape. It is also possible that an exterior aircraft light 120 according to an exemplary embodiment of the invention does not comprise an inner housing. Instead, the exterior aircraft light 120 may comprise only an exterior portion 8, which is configured to be mounted to an outer surface of the aircraft 100.

In the exemplary embodiment of FIGS. 3 and 4, two electric connection portions 6a, 6b are provided at the inner housing 4. The electric connection portions 6a, 6b are configured for mating with corresponding electric connectors of the aircraft, which are not shown in FIGS. 3 and 4. The electric connection portions 6a, 6b are configured for allowing a supply of electric energy to the exterior aircraft light 120 for operating the exterior aircraft light 120, such as a supply of electric energy from an on-board electricity network. The electric connection portions 6a, 6b may further be configured for transmitting control signals between the exterior aircraft light 120 and a controller (not shown), which is configured for operating and monitoring the operation of the exterior aircraft light 120.

Figure 5:
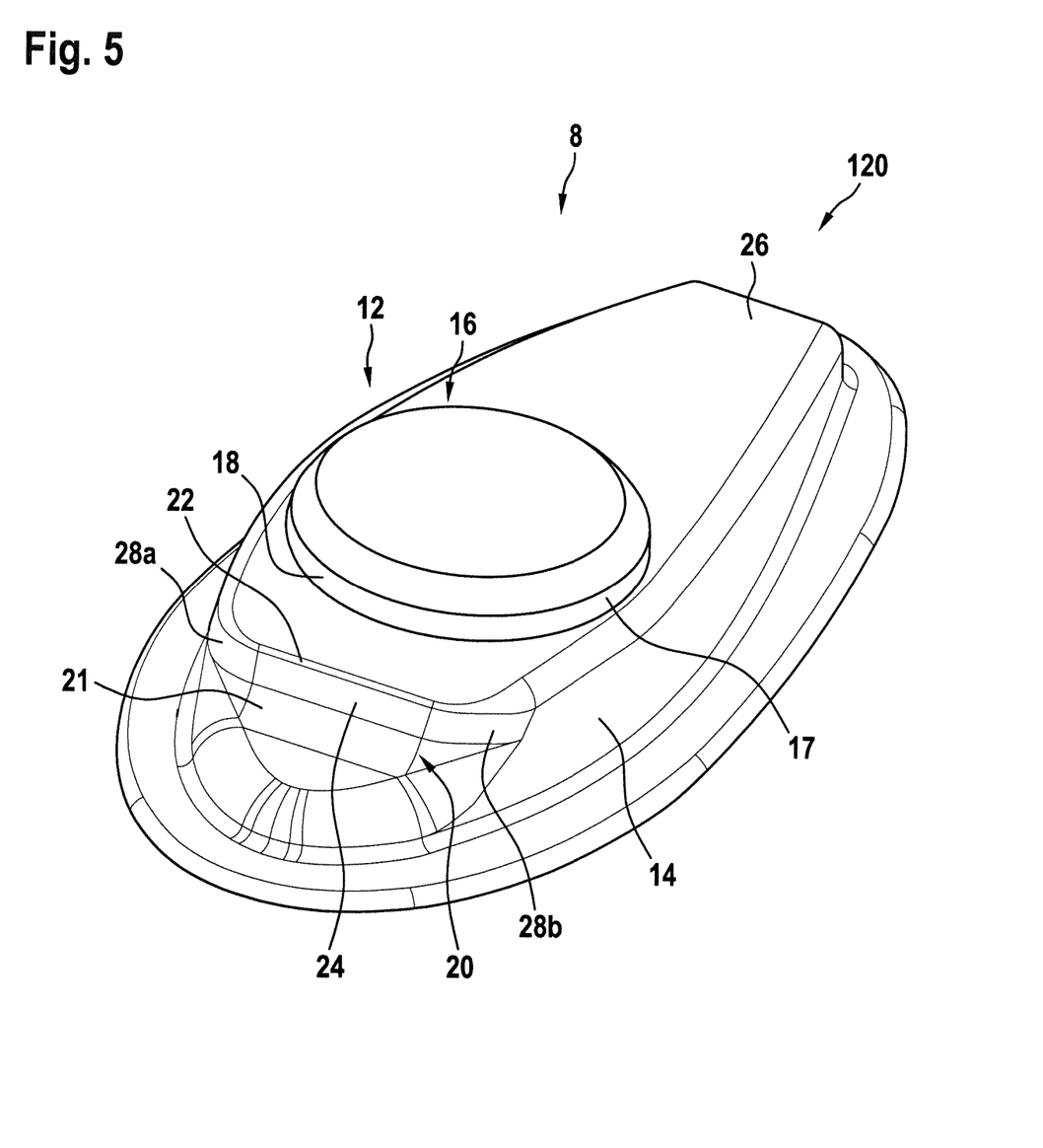
FIG. 5 shows a perspective view of the protective cover of the exterior aircraft light, which is depicted in FIGS. 3 and 4.

FIG. 5 shows a perspective view of the exterior portion 8 of an exterior aircraft light 120 according to an exemplary embodiment of the invention. In particular, FIG. 5 shows a perspective view of a protective cover 12 in accordance with an exemplary embodiment of the invention, wherein the protective cover 12 forms the outermost part of the exterior portion 8 of the exterior aircraft light 120 according to an exemplary embodiment of the invention.

Figure 6:
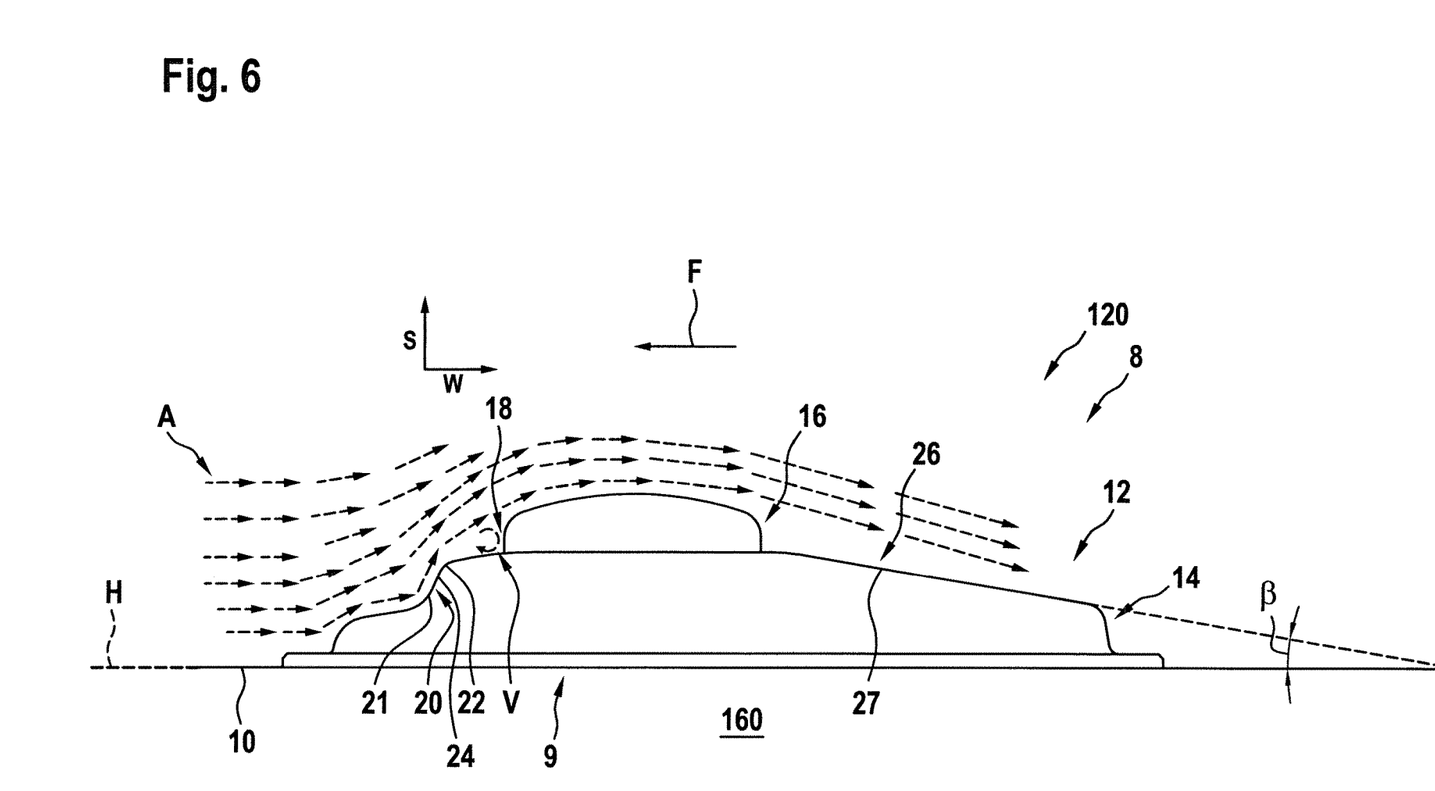
FIG. 6 shows a schematic side view of the protective cover, which is depicted in FIG. 5.
Figure 7:
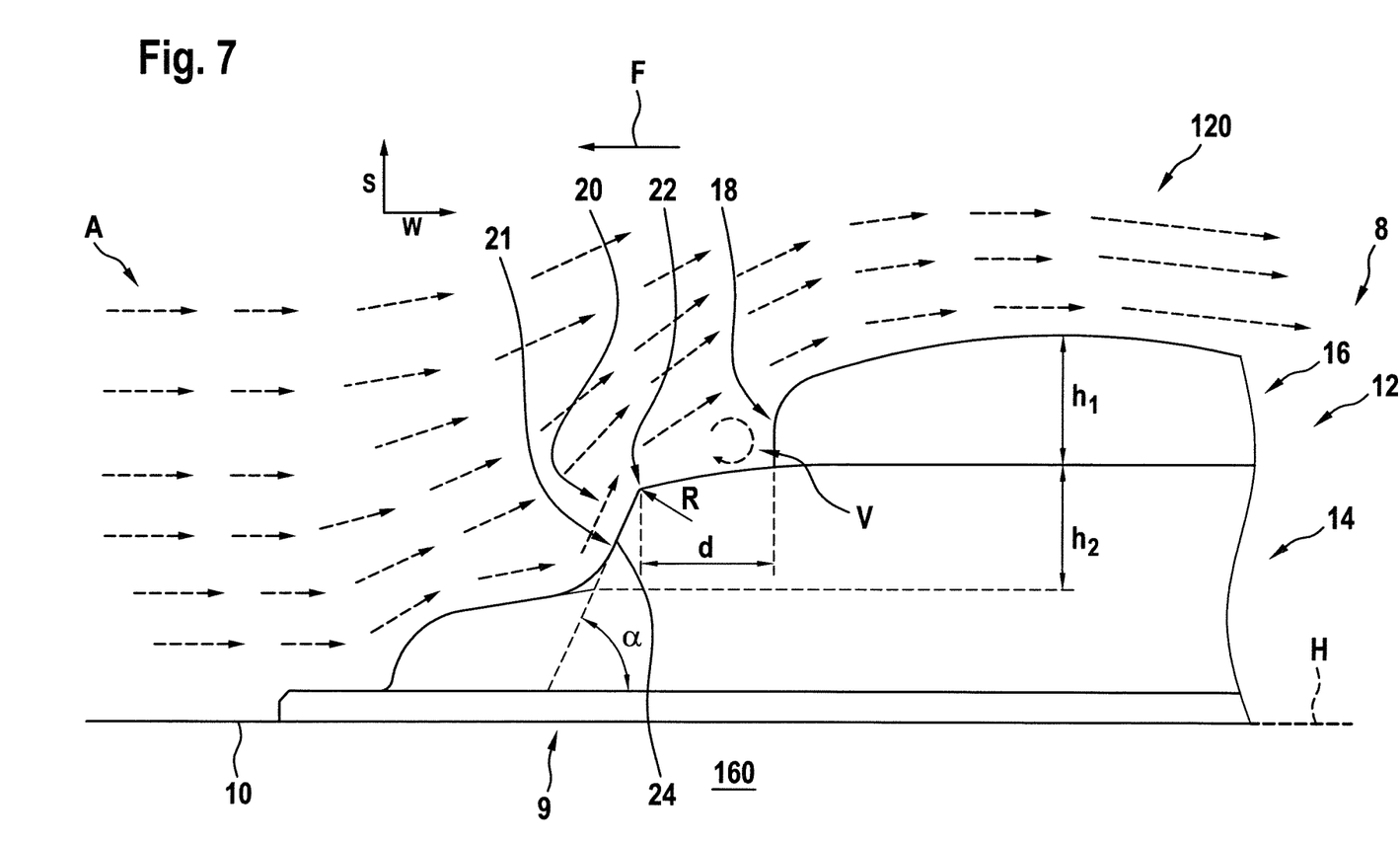
FIG. 7 shows an enlarged side view of a front portion of the protective cover, which is depicted in FIG. 6.

FIG. 6 shows a schematic side view of the exterior portion 8/protective cover 12 of the exterior aircraft light 120, as it is mounted to an outer skin 10 of the fuselage 160 of an aircraft 100; and FIG. 7 shows an enlarged side view of a forward part of the exterior portion 8/protective cover 12 of the exterior aircraft light 120, which is depicted in FIG. 6.

Although not explicitly shown in FIGS. 5 to 7, the exterior aircraft light 120 may also comprise an inner housing 4, which is connected with the exterior portion 8, as it is depicted in FIGS. 3 and 4.

The exterior portion 8 of the exterior aircraft light 120, as it is depicted in FIGS. 3 to 7, includes a protective cover 12, which is configured for protecting functional components of the exterior aircraft light 120, in particular the light sources 125a, 125b (cf. FIG. 1), from adverse environmental influences, such as mechanical impact and streams of ambient air, which may carry particles and/or drops of water.

The protective cover 12 includes a base portion 14 with the aircraft-facing mounting side 9, which is the lower side of the protective cover 12 in the orientation depicted in FIGS. 6 and 7 and which is configured for mounting the protective cover 12 to the outer skin 10 of the aircraft 100. The mounting side 9 is not visible in the perspective view of FIG. 5, as it is covered and hidden by the protective cover 12 itself.

In an alternative embodiment, which is not explicitly depicted in the Figures, the exterior aircraft light 120 may comprise an exterior aircraft light housing, which is located outside the outer skin 10 of the aircraft 100, when the exterior aircraft light 120 is mounted in its operational configuration to the aircraft 100. In such an embodiment, the mounting side 9 of the protective cover 12 may be configured for mounting the protective cover 12 to said exterior aircraft light housing. It is also possible that the mounting side 9 of the protective cover 12 is mounted to an inner housing of the exterior aircraft light 120, such as the inner housing 4 shown in FIGS. 3 and 4.

The protective cover 12 further comprises an at least partially light transmissive light output portion 16. The at least partially light transmissive light output portion 16 is arranged on the base portion 14 and includes a forward-facing light emission surface 18, i.e. a light emission surface 18 that is facing in a forward direction F (see FIGS. 6 and 7). The forward direction F is the direction of flight, when the exterior aircraft light 120 is mounted in its operational configuration to the aircraft 100.

In the exemplary embodiment depicted in FIGS. 3 to 7, the at least partially light transmissive light output portion 16 is dome-shaped and has a substantially circular cross-section in a plane parallel to the horizontal reference plane H.

The at least partially light transmissive light output portion 16 includes a circumferential light emission surface 17, which extends circumferentially along the outer periphery of the dome-shaped light output portion 16. As a result, the exterior aircraft light 120 may, in operation, emit light in all spatial directions in a 360° angle around the exterior aircraft light 120 in a horizontal plane. In the embodiment depicted in FIGS. 3 to 7, the circumferential light emission surface 17 extends along a circular contour. Other shapes/contours, in particular elliptical shapes/contours and polygonal shapes/contours, are possible as well.

The forward facing light emission surface 18 is a portion of said circumferential light emission surface 17. In particular, the forward facing light emission surface 18 is the forward facing portion of said circumferential light emission surface 17.

An air deflection zone 20 is formed at the base portion 14. The air deflection zone 20 is formed in front of and below the forward facing light emission surface 18. The air deflection zone 20 is configured for deflecting an impinging air stream A, which is flowing towards the exterior aircraft light 120.

The air deflection zone 20 is in particular shaped so that it directs at least a portion of the impinging air stream A along and over the forward facing light emission surface 18, thereby shielding the forward facing light emission surface 18 from the impinging air stream A and from impinging particles, which may be comprised in said impinging air stream A.

As it is schematically illustrated by the dashed arrows in FIGS. 6 and 7, which represent the impinging air stream A, the air deflection zone 20 is configured for deflecting at least a portion of the impinging air stream A so that the flowing direction of said deflected portion comprises a strong or large velocity component S parallel to the forward facing light emission surface 18 and a weak or small velocity component W orthogonal to the forward facing light emission surface 18. This can be best seen, when looking at the arrow depicted right at the air deflection zone 20.

In the orientation of the exterior aircraft light 120, as it is depicted in FIGS. 6 and 7, the strong component S is oriented substantially vertically, i.e. orthogonal to the forward direction F, and the weak component W is oriented substantially horizontally, i.e. anti-parallel to the forward direction F.

Due to the deflection by the air deflection zone 20, the deflected portion of the impinging air stream A flows along and over the forward facing light emission surface 18 and the light output portion 16 of the exterior aircraft light 120, without directly hitting or impinging on the forward facing light emission surface 18. In consequence, mechanical erosion of the forward facing light emission surface 18, which may be caused by particles comprised in the impinging air stream A, may be considerably reduced.

The air deflection zone 20 may in particular be configured so that a portion of the impinging air stream A is deflected to create a vortex V in front of the forward facing light emission surface 18. The vortex V may by created in a low pressure zone between the forward facing light emission surface 18 and the deflected portion of the impinging air stream A. The vortex V may provide an "air buffer", in which the velocity component of the circulating air flow, when flowing along the forward facing light emission surface 18, is very small in the direction orthogonal to the forward facing light emission surface 18. In consequence, the "air buffer", which is provided by the vortex V, may shield and protect the forward facing light emission surface 18 from being hit by particles, which may be comprised in the impinging air stream A.

In the exemplary embodiment depicted in the Figures, the air deflection zone 20 comprises a concave air directing surface 21 and an airflow breakaway edge 22. The airflow breakaway edge 22 is formed at an end portion of the concave air directing surface 21, wherein the end portion is oriented towards the forward facing light emission surface 18 of the protective cover 12. In the orientation of the protective cover 12 depicted in FIGS. 3 to 7, the airflow breakaway edge 22 is formed as an upper end portion of the concave air directing surface 21 at an upper end of the base portion 14, which faces away from the lower mounting side 9 of the protective cover 12.

The concave air directing surface 21 comprises a deflection portion 24, which abuts against the airflow breakaway edge 22 and which is substantially flat.

The concave air directing surface 21 deflects a portion of the impinging air flow A, which impinges on the exterior aircraft light 120, to flow upwards along the concave air directing surface 21 and to continue to flow upwards after detaching from the concave air directing surface 21 at the airflow breakaway edge 22. The paths of the impinging air stream A are indicated by the dashed arrows shown in FIGS. 6 and 7.

After detaching from the concave air directing surface 21, a portion of the detached air stream A continues to flow upwards, thereby passing the at least partially light transmissive light output portion 16 without impinging directly on the forward facing light emission surface 18 of the at least partially light transmissive light output portion 16/without hitting the forward facing light emission surface 18 of the at least partially light transmissive light output portion 16 head-on.

By creating a low pressure zone, the detached flow contributes to creating an air vortex V in front of the forward facing light emission surface 18, in particular in the area between the airflow breakaway edge 22 and the forward facing light emission surface 18.

Said air vortex V provides a buffer in front of the forward facing light emission surface 18 of the light output portion 16. The buffer may prevent particles, which may be comprised in the impinging flow of air A, from impacting on the forward facing light emission surface 18. By preventing the impact of particles, which are comprised in the impinging air stream A, at the forward facing light emission surface 18, erosion of the forward facing light emission surface 18, which is caused by particles impinging onto the forward facing light emission surface 18, may be considerably reduced.

In the embodiment depicted in FIGS. 3 to 7, the horizontal reference plane H is defined by the fuselage-facing mounting side 9 of the protective cover 12.

At the airflow breakaway edge 22, the flat deflection portion 24 of the concave air directing surface 21 may be inclined with respect to said horizontal reference plane H at an inclination angle $\alpha$ (see FIG. 7), which is in the range of between 50° and 80°, in particular at an inclination angle $\alpha$, which is in the range of between 60° and 70°. More particularly, the inclination angle $\alpha$ may be 65°.

The airflow breakaway edge 22 may have a radius R of curvature of less than 2 mm, in particular a radius R of curvature in the range of between 0.5 mm and 1.5 mm, more particularly a radius R of curvature in the range of between 0.75 mm and 1.25 mm.

The light output portion 16 of the protective cover 12 may have a first height h1 (see FIG. 7), and the vertical distance between the airflow breakaway edge 22 and the lower end of the concave air directing surface 21, i.e. the end of the concave air directing surface 21, which is facing away from the forward facing light emission surface 18 towards the fuselage-facing mounting side 9 of the protective cover 12, may be a second height h2. The second height h2 may be in a range of between 80% and 200%, in particular in a range of between 80% and 120%, further in particular in a range of between 90% and 110%, of the first height h1.

The airflow breakaway edge 22 may be spaced from the forward facing light emission surface 18 in a direction parallel to the horizontal reference plane H by a distance d, which is between 80% and 150% of the first height h1, in particular by a distance d, which is between 100% and 120% of the first height h1.

The first height h1 may be in the range of between 15 mm and 45 mm. In particular, the first height h1 may be in the range of between 25 mm and 35 mm.

A concave air directing surface 21 with such a geometry may be highly effective in reducing the erosion of the forward facing light emission surface 18 of the exterior aircraft light 120 by directing at least a portion of the impinging air stream A along and over the forward facing light emission surface 18 and shielding the forward facing light emission surface 18 from particles, which may be comprised in the impinging air stream A.

The base portion 14 of the protective cover 12 further comprises a tapered tail portion 26, which is located in a rear portion of the protective cover 12, i.e. in a portion of the protective cover 12, which is facing away from the forward direction F.

The tail portion 26 is shaped for guiding a portion of the impinging air stream A, which has been directed along and over the forward facing light emission surface 18 and the light output portion 16, towards the fuselage 106 of the aircraft 100. In order to reduce the drag, which is caused by the exterior aircraft light 120, the tapered tail portion 26 may in particular be configured for preventing the generation of vortices within the deflected portion of the impinging air stream A, after it has passed the light output portion 16.

In the embodiment depicted in the Figures, an upper surface 27 of the tapered tail portion 26 is inclined with respect to the horizontal reference plane H (see FIG. 6). The upper surface 27 of the tapered tail portion 26 may in particular be inclined with respect to the horizontal reference plane H at an angle (3, which is in the range of between 5° and 15°, in particular at an angle (3 of approximately 10°. Such an inclination of the upper surface of the tapered tail portion 26 may be beneficial for avoiding the generation of vortices in the deflected portion of the impinging air stream A and reducing the drag caused by the exterior aircraft light 120.

The base portion 14 may further comprise a pair of two convexly curved side portions 28a, 28b (see FIGS. 4 and 5), which are arranged laterally next to the concave air directing surface 21, so that the concave air directing surface 21 is arranged in between the two convex side portions 28a, 28b in a lateral direction.

The two convex side portions 28a, 28b are configured for directing portions of air of the impinging air stream A, in particular portions of air comprised in the lower part of the impinging air stream A, laterally around the protective cover 12, in particular around the base portion 14 of the protective cover 12. The two convex side portions 28a, 28b may in particular be formed for reducing the drag, which is caused by the protective cover 12, in particular by the base portion 14 of the protective cover 12, when it is exposed to an impinging air stream A.

Figure 8:
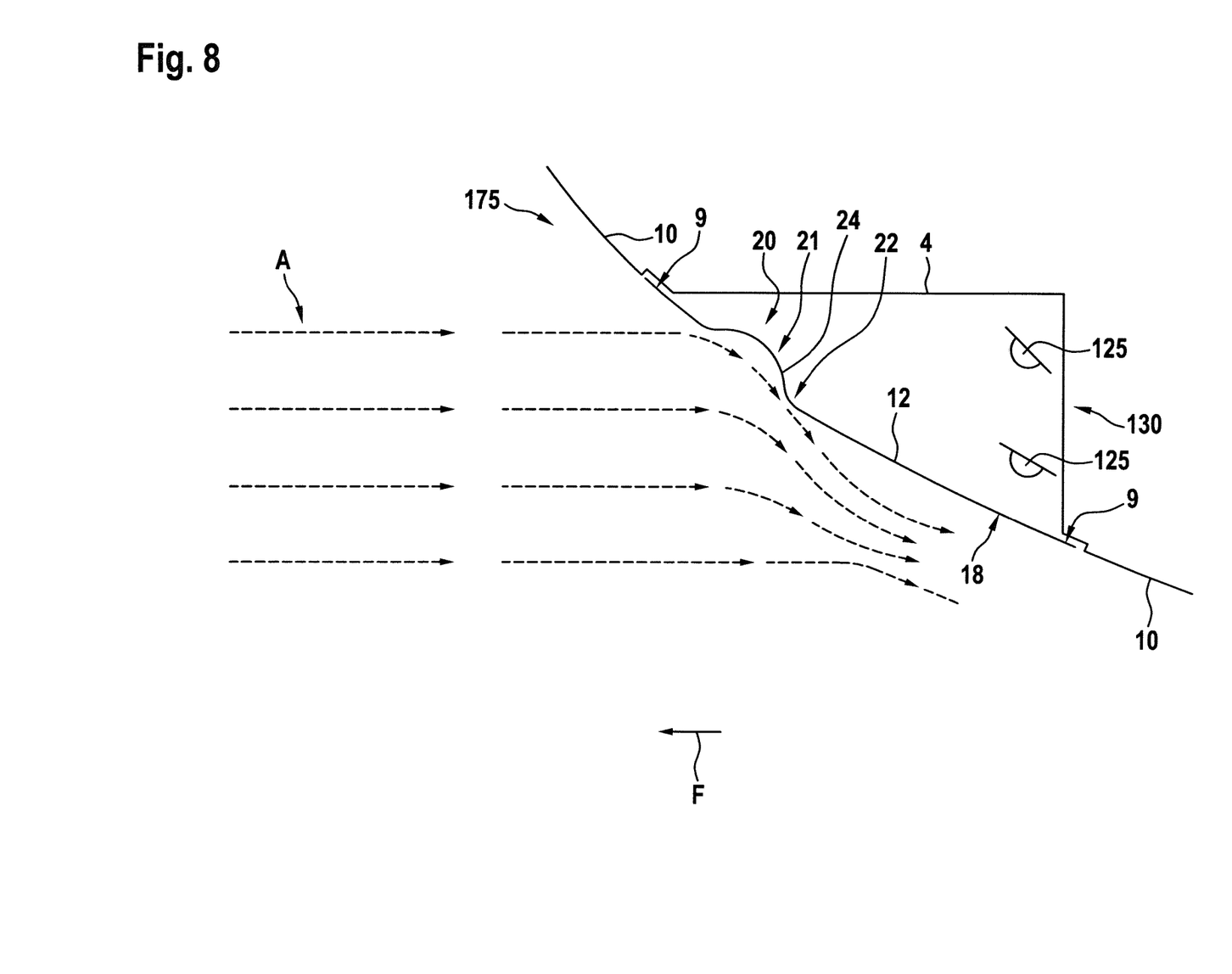
FIG. 8 depicts a cross-sectional view of an exterior aircraft light according to a further embodiment of the invention.

FIG. 8 depicts a cross-sectional view of an exterior aircraft light 130 according to a further exemplary embodiment of the invention. The cross-sectional plane of the cross-sectional view depicted in FIG. 8 is oriented vertically, i.e. orthogonal to a plane, which is spanned by the wings 170a, 170b of the aircraft 100.

The exterior aircraft light 130 is located in a wing root 175 of an aircraft 100, i.e. in a portion of the aircraft 100, which provides the interface between one of the wings 170a, 170b and the fuselage 160 of the aircraft 100 (cf. FIGS. 1 and 2).

The exterior aircraft light 130 may be a landing light, a take-off light, a taxi light 132a, 132b, a runway turn-off light 134a, 134b, or a multi-functional light, which combines the functionalities of at least two of said lights, such as a combined landing and take-off light 130a, 130b (cf. FIGS. 1 and 2).

The exterior aircraft light 130 comprises a housing 4, which is arranged on the inside of the outer skin 10 of the aircraft 100. At least one light source 125 is provided within the housing 4. The exterior aircraft light 130 may further comprise at least one optical element, which is not shown in the Figures, such as a lens or a reflector, for shaping the light output of the exterior aircraft light 130. In the exemplary embodiment of FIG. 8, two light sources 125 are depicted for illustrative purposes.

The exterior aircraft light 130 further comprises a protective cover 12 according to an exemplary embodiment of the invention. The protective cover 12 is provided at a forward facing front side of the exterior aircraft light 130. The protective cover 9 comprises a fuselage-facing mounting side 9, with which it is mounted to the housing 4 of the exterior aircraft light 130 or to the outer skin 10 of the aircraft 100. In the exemplary embodiment of FIG. 8, the fuselage-facing mounting side 9 provides for a circumferential mounting of the protective cover 12 to the housing 4 and, thus, to the wing root 175 of the aircraft.

For reducing the drag, which is caused by the protective cover 12, when the aircraft 100 is in flight, the protective cover 12 is shaped so that it smoothly blends into the outer contour of the wing root 175 of the aircraft 100.

Similar to the embodiment, which is depicted in FIGS. 3 to 7, the protective cover 12 according to the embodiment of FIG. 8 comprises a light transmissive forward facing light emission surface 18, which is arranged for allowing light, which is emitted by the light sources 125, to pass through the protective cover 12.

The protective cover 12 further comprises an air deflection zone 20. The air deflection zone 20 is formed in a portion of the protective cover 12, which is located in front of the light emission surface 18 along the direction of flight F.

Similar to the embodiment, which is depicted in FIGS. 3 to 7, the air deflection zone 20 of the exemplary embodiment of FIG. 8 is shaped so that it directs a portion of an impinging air stream A, which flows towards the exterior aircraft light 130 when the aircraft 100 is in flight, along and over the forward facing light emission surface 18, thereby shielding the forward facing light emission surface 18 from the impinging air stream A and particles, which may be comprised in the impinging air stream A.

The air deflection zone may comprise a concave air directing surface 21 and an airflow breakaway edge 22. The airflow breakaway edge 22 forms an end portion of the concave air directing surface 21 towards the forward facing light emission surface 18.

The concave air directing surface 21 may comprises a substantially flat deflection portion 24, which abuts against the airflow breakaway edge 22.

The concave air directing surface 21 and the airflow breakaway edge 22 may be shaped so that a portion of the impinging air stream A detaches from the protective cover 12 and shields the forward facing light emission surface 18 by creating a low pressure zone at the forward facing light emission surface 18.

As a result, a protective cover 12, as it is depicted in FIG. 8, may allow for reducing erosion, which may be caused by an impinging air stream A onto the forward facing light emission surface 18 of an exterior aircraft light 130, which is located in a wing root 175 of an aircraft 100. The reduction of erosion may be achieved by directing at least a portion of the impinging air stream A along and over the forward facing light emission surface 18 of the protective cover 12.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A protective cover for a fuselage-mounted exterior aircraft light, the protective cover comprising:
   a fuselage-facing mounting side for mounting the protective cover to an exterior aircraft light housing or to an exterior skin of an aircraft;
   a light transmissive forward facing light emission surface; and
   an air deflection zone, which is shaped to direct a portion of an impinging air stream (A) along and over the forward facing light emission surface for shielding the forward facing light emission surface from the impinging air stream (A).

2. The protective cover according to claim 1, further comprising:
   a base portion including the fuselage-facing mounting side; and
   an at least partially light transmissive light output portion, which is arranged on the base portion and which includes the forward facing light emission surface.

3. The protective cover according to claim 2, wherein the air deflection zone is formed on the base portion.

4. The protective cover according to claim 1, wherein the air deflection zone comprises a concave air directing surface and an airflow breakaway edge, with the airflow breakaway edge forming an end portion of the concave air directing surface towards the forward facing light emission surface.

5. The protective cover according to claim 4, wherein the concave air directing surface is substantially flat at the airflow breakaway edge.

6. The protective cover according claim 4, wherein the light output portion has a first height, wherein the concave air directing surface has a second height, wherein the second height is between 80% and 120% of the first height.

7. The protective cover according to claim 4, wherein the light output portion has a first height and wherein the airflow breakaway edge is spaced from the light output portion by a distance (d) of between 80% and 150% of the first height.

8. The protective cover according to claim 4, wherein the protective cover defines a horizontal reference plane (H) and wherein the concave air directing surface is, at the airflow breakaway edge, inclined with respect to the horizontal reference plane (H) at an inclination angle (a) of between 50° and 80°.

9. The protective cover according to claim 4, wherein the airflow breakaway edge has a radius (R) of curvature of less than 2 mm.

10. The protective cover according to claim 1, wherein the base portion further comprises a tapered tail portion for guiding the portion of the impinging air stream (A), directed along and over the forward facing light emission surface, towards the fuselage of the aircraft.

11. An exterior aircraft light, comprising:
    an exterior aircraft light housing;
    at least one light source; and
    a protective cover according to claim 1;
    wherein the at least one light source is arranged in an interior space between the aircraft light housing and the protective cover.

12. The exterior aircraft light according to claim 11, wherein the exterior aircraft light is a fuselage-mounted aircraft beacon light and wherein the forward facing light emission surface is part of a circumferential light emission surface.

13. The exterior aircraft light according to claim 11, wherein the exterior aircraft light is configured to be located at a wing root of an aircraft.

14. The exterior aircraft light according to claim 13, wherein the exterior aircraft light is a landing light, a take-off light, a taxi light, a runway turn-off light, or a multi-functional light, which combines the functionalities of at least two of said lights.

15. An aircraft comprising at least one exterior aircraft light according to claim 11.

* * * * *